(12) United States Patent
Pun

(10) Patent No.: US 8,134,950 B2
(45) Date of Patent: Mar. 13, 2012

(54) CLUSTER HEAD ELECTION IN AN AD-HOC NETWORK

(75) Inventor: Ngan-cheung Pun, Fairport, NY (US)

(73) Assignee: Harris Corporation, Melbourne, FL (US)

( * ) Notice: Subject to any disclaimer, the term of this patent is extended or adjusted under 35 U.S.C. 154(b) by 936 days.

(21) Appl. No.: 11/695,835

(22) Filed: Apr. 3, 2007

(65) Prior Publication Data

US 2008/0247353 A1   Oct. 9, 2008

(51) Int. Cl.
  *H04W 4/00*      (2009.01)
  *H04L 12/28*    (2006.01)

(52) U.S. Cl. .................. 370/328; 370/331; 370/255

(58) Field of Classification Search .......... 455/445, 455/7; 370/238, 338, 328, 256; 709/227
See application file for complete search history.

(56) References Cited

U.S. PATENT DOCUMENTS

| | | | | |
|---|---|---|---|---|
| 5,412,654 | A | 5/1995 | Perkins | 370/94.1 |
| 5,987,011 | A * | 11/1999 | Toh | 370/331 |
| 6,304,556 | B1 | 10/2001 | Haas | 370/254 |
| 6,711,409 | B1 * | 3/2004 | Zavgren et al. | 455/445 |
| 6,829,222 | B2 * | 12/2004 | Amis et al. | 370/238 |
| 7,203,729 | B2 * | 4/2007 | Chen et al. | 709/209 |
| 2001/0012757 | A1 | 8/2001 | Boyle | 455/11.1 |
| 2006/0268745 | A1 | 11/2006 | Hur et al. | 370/254 |

FOREIGN PATENT DOCUMENTS

| WO | 02/09340 | 1/2002 |
|---|---|---|
| WO | 2005/074201 | 8/2005 |

OTHER PUBLICATIONS

Schaeffer et al., "Dynamic Local Clustering for Hierarchical Ad Hoc Networks", Lab for Theoretical Computer Science, Finland, pp. 1-5.
Sohrabi et al., "Scalable Self-Assembly for Ad Hoc Wireless Sensor Networks", Sensoria Corporation, Culver City, CA, pp. 1-8.
Kawadia et al., "Power Control and Clustering in Ad Hoc Network", IEEE Infocom 2003, No. 0-7803-7753-2, pp. 1-11.
Khan et al., "Self-configuring Node Cluster, Data Aggregation, and Security in Microsensor Networks", Dept. of Computer Science, West Lafayette, IN, pp. 1-8.
Sharfraz et al., "Backbone Based Routing Protocol with Adaptive MAC for Heterogeneous Ad Hoc Networks", College of Engineering/Guindy-Anna University.
Johansson et al., "On Clustering in Ad Hoc Networks", Lulea University of Technology, Aug. 17, 2003, pp. 1-3.

(Continued)

*Primary Examiner* — Lester Kincaid
*Assistant Examiner* — Kuo Woo
(74) *Attorney, Agent, or Firm* — Allen, Dyer, Doppelt, Milbrath & Gilchrist, P.A.

(57) ABSTRACT

The ad-hoc network includes a plurality of mobile nodes including at least one group of mobile nodes operating as a cluster with a currently elected cluster head node. The mobile nodes include a controller and a wireless communications device cooperating therewith to determine whether the currently elected cluster head node appears inactive and then initiate a token-based cluster head node election based thereon. During the token-based cluster head node election, the cluster mobile nodes generate and transmit tokens having respective token weights, receive tokens from neighboring nodes, selectively retransmit the tokens based upon the token weights, and elect a new cluster head node based upon the token weights.

26 Claims, 3 Drawing Sheets

OTHER PUBLICATIONS

Villasenor-Gonzalez et al., "HOLSR: A hierarchical proactive routing mechanism for mobile ad hoc networks", IEEE Communications Magazine, Jul. 2005, pp. 118-125.

Demirbas et al., "Design and analysis of a fast local clustering service for wireless sensor networks", Proceedings of the First International Conference on Broadband Networks (Broadnet'04), Jan. 2004, pp. 1-10.

* cited by examiner

CLUSTER HEAD ELECTION IN AN AD-HOC NETWORK

FIELD OF THE INVENTION

The present invention relates to the field of communications, and, more particularly, to wireless communications in ad-hoc networks and related methods.

BACKGROUND OF THE INVENTION

Wireless networks have experienced increased development in the past decade. One of the most rapidly developing areas is mobile ad-hoc networks. Physically, a mobile ad-hoc network includes a number of geographically-distributed, potentially mobile nodes sharing a common radio channel. Compared with other types of networks, such as cellular networks or satellite networks, the most distinctive feature of mobile ad-hoc networks is the lack of any fixed infrastructure. The network may be formed of mobile nodes only, and a network is created "on the fly" as the nodes transmit with each other. The network does not depend on a particular node and dynamically adjusts as some nodes join or others leave the network.

Because of these unique characteristics, routing protocols for governing data flow within ad-hoc networks are required which can adapt to frequent topology changes. Two basic categories of ad-hoc routing protocols have emerged in recent years, namely reactive or "on-demand" protocols, and proactive or table-driven protocols. Reactive protocols collect routing information when a particular route is required to a destination in response to a route request. Examples of reactive protocols include ad-hoc on demand distance vector (AODV) routing, dynamic source routing (DSR), and the temporally ordered routing algorithm (TORA).

On the other hand, proactive routing protocols attempt to maintain consistent, up-to-date routing information from each node to every other node in the network. Such protocols typically require each node to maintain one or more tables to store routing information, and they respond to changes in network topology by propagating updates throughout the network to maintain a consistent view of the network. Examples of such proactive routing protocols include destination-sequenced distance-vector (DSDV) routing, which is disclosed in U.S. Pat. No. 5,412,654 to Perkins; the wireless routing protocol (WRP); and cluster head gateway switch routing (CGSR). A hybrid protocol which uses both proactive and reactive approaches is the zone routing protocol (ZRP), which is disclosed in U.S. Pat. No. 6,304,556 to Haas.

One challenge to the advancement of ad-hoc network development is that of extending such networks to encompass large numbers of nodes. One prior art attempt to do so utilizes "spine" routing, such as in the optimal spine routing (OSR) approach disclosed by Das et al. in "Routing in Ad-Hoc Networks using Minimum Connected Dominating Sets," IEEE Int. Conf. On Commun. (ICC '97), 1997. In this approach, a spine or "virtual backbone" is defined such that each network node is no more than one hop from a spine node. Global topology (link state) is maintained at each spine node, and a link-state routing algorithm is run at each spine node to produce current routes to every destination.

Another related approach is clustered spine routing (CSR), which is disclosed by Das et al. in "Routing in Ad-Hoc Networks using a Spine," IEEE Int. Conf. On Computer Commun. and Networks (IC3N '97), 1997 this approach is intended to extend the applicability of spine routing to larger network sizes by grouping the nodes in clusters and adding a second hierarchical level to the OSR approach. Yet another approach is known as partial knowledge spine routing (PSR) which is disclosed by Sivakumar et al. in "The Clade Vertebrata: Spines and Routing in Ad-Hoc Networks," IEEE Symposium On Computer and Commun., 1998.

In an ad hoc network, a cluster is a group of nodes that are topologically connected and share a membership in the group. The cluster could span 1-hop or multiple hops. The header node of the cluster has certain specific functions that benefit the cluster and may be referred to as the cluster head or Group Server Node (GSN). Any node may become the GSN and the GSN's node ID may be used for the group ID. There should be only one GSN in the group and a new GSN should be elected if the current GSN is powered down or leaves the network or group.

The approach used to elect a GSN should be a distributed method since nodes in the network only have local knowledge. No single node should be manually pre-selected to arbitrate which node should be the next GSN. The approach should also be robust since, in an ad-hoc network with nodes coming and leaving, powering down and disappearing, the topology is changing. The GSN may be re-elected. Problems include that the election method may result in electing more than one GSN, or electing no GSN. The elected GSN may become inaccessible, due to the asymmetrical links, unstable links, breaking of communication handshaking. If more than one GSN is elected, some of them have to give up the status. Also, the election process may require the nodes to consume a lot of bandwidth, as system overhead.

GSN election, group merging and timing may not be supported. The GSN is the timing reference node. During group merging, part of the nodes in one group are switching to a new group, and a simultaneous change in the network timing may also be happening. If a GSN election is also in progress, the nodes become confused as to which node holds the right timing and how many GSNs may be coexisting in this mixed state.

Also, during the GSN election, part of the network may be separated out into more than one sub-group and an elected GSN may be not reachable in some separated sub-groups. Furthermore, a GSN may be partially departed from the network, leaving an asymmetrical link connected to the cluster. The cluster nodes can all hear the GSN but cannot send to the GSN. The new GSN election must be able to proceed under the asymmetrical link influence of the previous GSN. The member nodes should not forever exclude the previous GSN into the group as the previous GSN should be allowed to come back as a regular member node.

One approach that addresses some of these problems is the Low-energy localized clustering (LLC) algorithm. Any node that does not see another node declared as cluster head in the local neighborhood for a certain time will just declare itself as a cluster head. Multiple cluster heads could be elected in a multi-hopped network. In the process, each node sends an advertisement message to declare its membership so the approach is not bandwidth efficient. If acknowledgments are included in the approach, more bandwidth is consumed. Some messages could be dropped due to unstable links, and an asymmetrical link could result in an unreachable cluster head. Moreover, in this LLC approach, the cluster is confirmed to a 2-hop neighbor type only, and many clustering approaches may span more than 2-hops.

Another approach is the Low Energy Adaptive Clustering Hierarchy (LEACH) Algorithm which is a more bandwidth efficient method. Periodically a node abandons the existing cluster head and declares itself as a cluster head with a probability. This method does not require a lot of message exchange but could result in multiple cluster heads, or no cluster head. So, this approach may not be suitable for many applications.

SUMMARY OF THE INVENTION

In view of the foregoing background, it is therefore an object of the present invention to provide a bandwidth efficient, distributed and robust cluster head node election approach in an ad-hoc network.

This and other objects, features, and advantages in accordance with the present invention are provided by an ad-hoc network including a plurality of mobile nodes including at least one group of mobile nodes operating as a cluster with a currently elected cluster head node, and each mobile node including a controller and a wireless communications device cooperating therewith to determine whether the currently elected cluster head node appears inactive and initiate a token-based cluster head node election based thereon. During the token-based cluster head node election the cluster mobile nodes generate and transmit tokens having respective token weights, receive tokens from neighboring nodes, selectively retransmit the tokens based upon the token weights, and elect a new cluster head node based upon the token weights.

The controller and the wireless communications device may cooperate to determine that the currently elected cluster head node is inactive based upon failing to receive a status message from the currently elected cluster head node for a predetermined time period. Also, The controller and the wireless communications device may cooperate to determine that the currently elected cluster head node is inactive based upon a failing to overhear a response message from the currently elected cluster head node, sending a confirmation request message to the currently elected cluster head node, and failing to receive a confirmation message from the currently elected cluster head node.

The determination of whether the currently elected cluster head node is inactive may further include the controller and wireless communications device cooperating therewith to determine the presence of at least one neighbor node. The tokens may comprise respective election messages each including a node ID and a parameter value, e.g. indicating a number of neighbor nodes of the corresponding cluster node. The associated token weight may be defined by a weight value based upon the node ID and the parameter value. The controller and wireless communications device may cooperate to retransmit a best token defined as the received token with a highest weight value. The controller may also store the node ID of the best token as the cluster head node ID. The election message may further include a group ID defining a boundary for transmission of the token, and/or a time-to-live field defining a number of times the token can be transmitted.

Another aspect of the invention is directed to a mobile node for operation in a cluster of mobile nodes within in ad-hoc network, the cluster including a currently elected cluster head node, and the mobile node including a controller and a wireless communications device cooperating therewith to determine whether the currently elected cluster head node appears inactive and initiate a token-based cluster head node election based thereon. The election preferably includes generating and transmitting tokens having respective token weights, receiving tokens from neighboring nodes, selectively retransmitting the tokens based upon the token weights, and electing a new cluster head node based upon the token weights.

A method aspect of the invention is directed to electing a cluster head node for a group of mobile nodes operating as a cluster within a mobile ad-hoc network, including determining whether the currently elected cluster head node appears inactive, and initiating a token-based cluster head node election based upon the determination. During the election, the cluster mobile nodes generate and transmit tokens having respective token weights, receive tokens from neighboring nodes, selectively retransmit the tokens based upon the token weights, and elect a new cluster head node based upon the token weights.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It is appreciated by one skilled in the art that the approach of the present invention is not limited for use with any particular communication standard (wireless or otherwise) and can be adapted for use with numerous wireless (or wired) communications standards such as Enhanced Data rates for GSM Evolution (EDGE), General Packet Radio Service (GPRS) or Enhanced GPRS (EGPRS), extended data rate Bluetooth, Wideband Code Division Multiple Access (WCDMA), Wireless LAN (WLAN), Ultra Wideband (UWB), coaxial cable, radar, optical, etc. Further, the invention is not limited for use with a specific PHY or radio type but is applicable to other compatible technologies as well.

Note that throughout this description, the term communications device is defined as any apparatus or mechanism adapted to transmit, receive or transmit and receive data through a medium. The communications device may be adapted to communicate over any suitable medium such as RF, wireless, infrared, optical, wired, microwave, etc. In the case of wireless communications, the communications device may comprise an RF transmitter, RF receiver, RE transceiver or any combination thereof. Wireless communication involves: radio frequency communication; microwave communication, for example long-range line-of-sight via highly directional antennas, or short-range communication; and/or infrared (IR) short-range communication. Applications may involve point-to-point communication, point-to-multipoint communication, broadcasting, cellular networks and other wireless networks.

Figure 1:
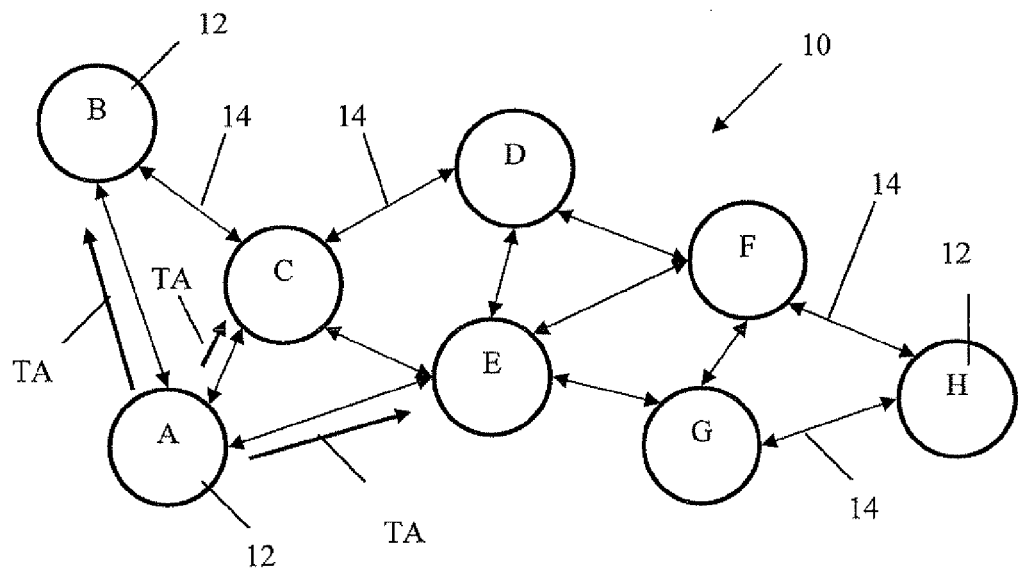
FIGS. 1 and 2 are schematic snapshot views of an ad-hoc network during a token-based cluster head node election in accordance with the present invention.
Figure 2:
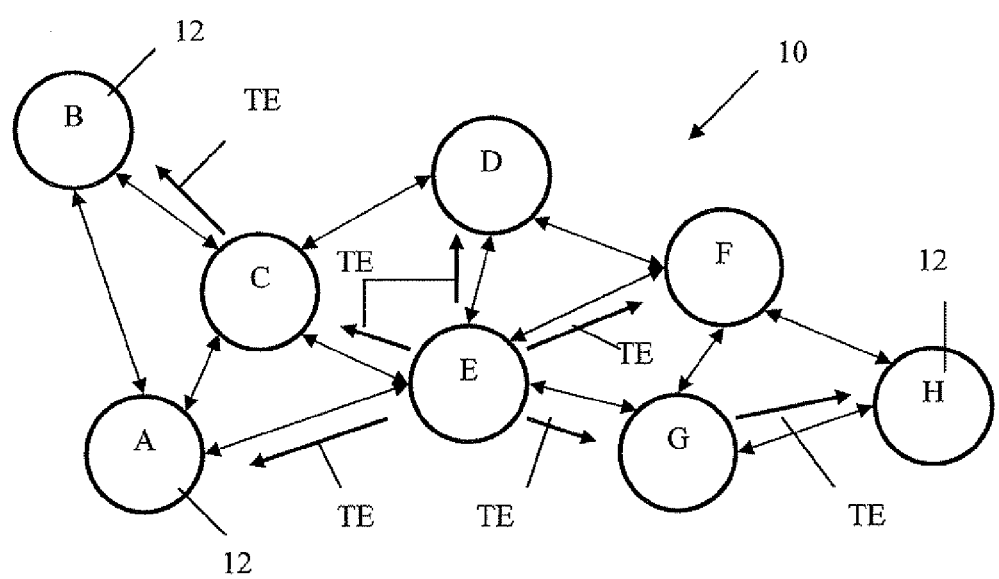

FIGS. 1 and 2 are snapshots of an example network 10 of mobile nodes 12 operating as a cluster and showing wireless links 14 connecting the nodes. The network 10 includes the plurality of mobile nodes 12, such as laptop computers, personal digital assistants (PDAs) or mobile phones, that are connected by wireless communication links 14 as would be appreciated by the skilled artisan. A link 14 is the basic connection in a network and is simply the physical link between any two nodes 12. Information describing the node includes a node ID (IP address, ATM address, etc) and positional information if available. Such a network could be a mobile ad-hoc wireless communications system. Such examples of networks are set forth in commonly assigned U.S. Pat. Nos. 6,763,013; 6,754,192; and U.S. Pat. Publication Nos. 2005/0053003 and 2004/0203820, the disclosures which are incorporated by reference in their entirety.

In an ad hoc network, a cluster is a group of nodes that are topologically connected and share a membership in the group. The cluster could span 1-hop or multiple hops. The header node of the cluster has certain specific functions that benefit the cluster and may be referred to as the cluster head or Group Server Node (GSN). Any node may become the GSN and the GSN's node ID may be used for the group ID. There should be only one GSN in the group and a new GSN should be elected if the current GSN is powered down or leaves the network or group.

The approach used to elect a GSN should be a distributed method since nodes in the network only have local knowledge. No single node should be manually pre-selected to arbitrate which node should be the next GSN. The approach should also be robust since, in an ad-hoc network with nodes coming and leaving, powering down and disappearing, the topology is changing. The GSN may be re-elected because, for example, the elected GSN may become inaccessible or appear inactive, due to asymmetrical links, unstable links, and/or breaking of communication handshaking.

Figure 4:
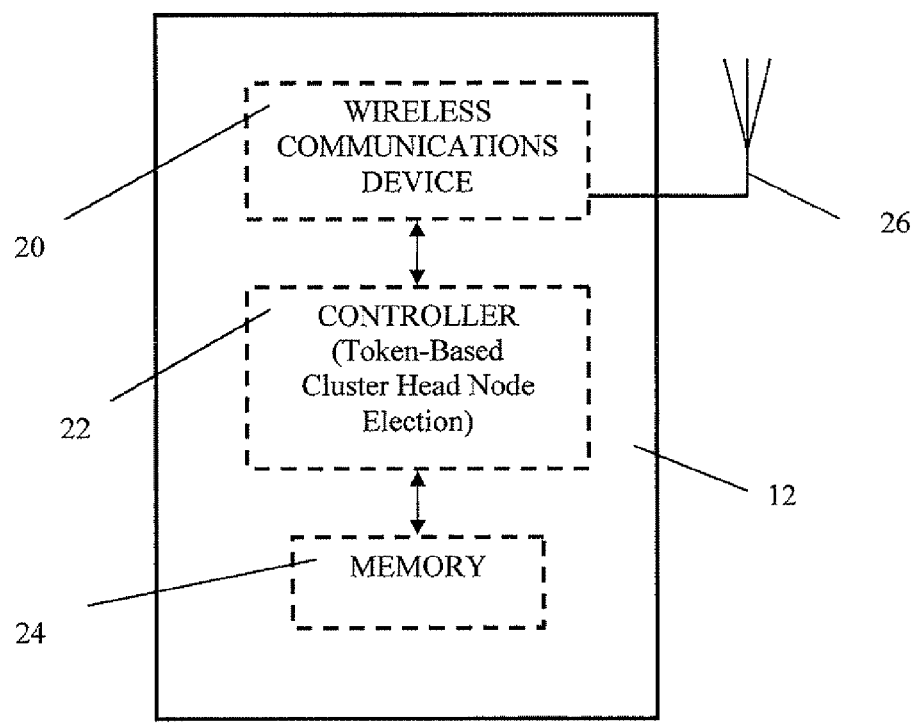
FIG. 4 is a schematic block diagram illustrating an example of a wireless node for use in the ad-hoc network of FIGS. 1 and 2.

Referring more specifically to FIG. 4, the nodes 12 may be any suitable type of mobile device capable of communicating within a MANET, including a wireless communications device 20, for example, and other devices which will be appreciated by those of skill in the art. Of course, it will also be appreciated that certain nodes 12 may optionally be connected to a fixed communication infrastructure in some applications, if desired.

The mobile nodes 12 further illustratively include a controller 22, the operation of which will be described below. By way of example, the controller 22 may be implemented using microprocessors, memory, software, etc., as will be appreciated by those of skill in the art. An associated memory 24 may also be included. Furthermore, the wireless communications device 20 may include wireless modems, wireless local area network (LAN) devices, cellular telephone devices, etc., as well as an associated antenna 26 or antennas, as illustratively shown. By way of example, one or more phased array antennas (as well as other suitable antennas) may be used, as will be appreciated by those skilled in the art.

Referring again to FIGS. 1 and 2, the ad-hoc network includes at least one group of mobile nodes 12 operating as a cluster with a currently elected cluster head node X. Each mobile node 12 includes the controller 22 and the wireless communications device 20 cooperating therewith to determine whether the currently elected cluster head node X appears inactive and initiate a token-based cluster head node election based thereon. For example, the currently elected cluster head node X may have powered down, disappeared, become inaccessible due to asymmetrical links, unstable links, and/or breaking of communication handshaking, or experienced equipment failure or overload.

Figure 3:
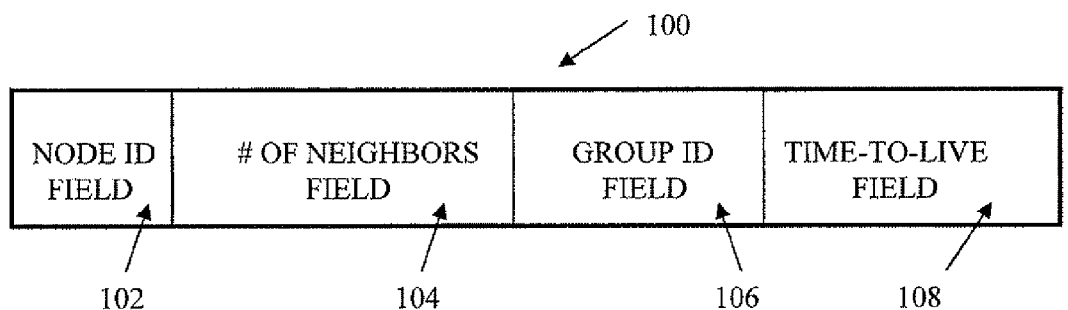
FIG. 3 is a schematic diagram illustrating an example of the fields of an election token used in the token-based cluster head node election in accordance with the present invention.

During the token-based cluster head node election the cluster mobile nodes 12 generate and transmit tokens 100, for example, as illustrated in FIG. 3. Such a token has a respective token weight which will be discussed below. The nodes 12 receive tokens from neighboring nodes, selectively retransmit the tokens based upon the token weights, and elect a new cluster head node based upon the token weights.

A token 100 is a small condensed message that can be passed around. As illustrated in FIG. 3, a token 100 may be an election message including a node ID field 102 and a parameter value field 104, e.g. indicating a number of neighbor nodes of the corresponding cluster node. The associated token weight may be defined by a weight value based upon the node ID and the parameter value. The election message may further include a group ID field 106 defining a boundary for transmission of the token 100, and/or a time-to-live field 108 defining a number of times the token can be transmitted. As an example, the weight of token may be 32 bits including two fields such as 8 bits representing the number of neighbors of the node, and 24 bits indicating the Node ID. A bigger decimal value of the 32 bits means the token is better.

The controller 22 and the wireless communications device 20 may cooperate to determine that the currently elected cluster head node X is inactive based upon failing to receive a status message from the currently elected cluster head node for a predetermined time period. Also, the controller 22 and the wireless communications device 20 may cooperate to determine that the currently elected cluster head node X is inactive based upon a failing to overhear a response message from the currently elected cluster head node, sending a confirmation request message to the currently elected cluster head node, and failing to receive a confirmation message from the currently elected cluster head node.

For example, the cluster head node X may send a keep alive message to the cluster nodes 12, e.g. once every two seconds. If node A fails to receive the keep alive message for a certain period of time it means the cluster head node X is gone or can no longer operate as the cluster head node. Alternatively, the cluster head node X may not be responding to a request message initiated by any of the cluster nodes 12. The response message is not overheard by cluster node A, then the node A would initiate a special request message to the node X to confirm and see if node X can respond or not. Once node X is detected to be missing, the node A will initiate a token-based election.

The determination of whether the currently elected cluster head node X is inactive may further include the controller 22 and wireless communications device 20 cooperating therewith to determine the presence of at least one neighbor node. In other words, it may be desirable to confirm that it is not the node A itself that has left the cluster.

As illustrated, node begins a token-based cluster head node election by transmitting its token TA to neighbors nodes B, C and E in the cluster (FIG. 1) However, as illustrated in FIG. 2, the token TE from node E is better, e.g. because node E has more neighbors. So, the token TE will be the token retransmitted by other nodes 12 of the cluster, and in the example, the token TE will be relayed to the other cluster nodes within two hops.

The controller 22 and wireless communications device 20 of each node 12 cooperate to retransmit a best token defined as the received token with a highest weight value. The controller 22 may also store the node ID of the best token as the cluster head node ID.

Preferably, a token is created by each node only once in a given election process. Each node upon receiving the first election token will also create their own token. Each node may have received different tokens from different neighbors. Among the collection, only the best token is being retransmitted. The node will keep the best token for future comparisons. The token time-to-live (TTL) field is also decremented. The node ID of the best token is then used as the new cluster head node ID.

Figure 5:
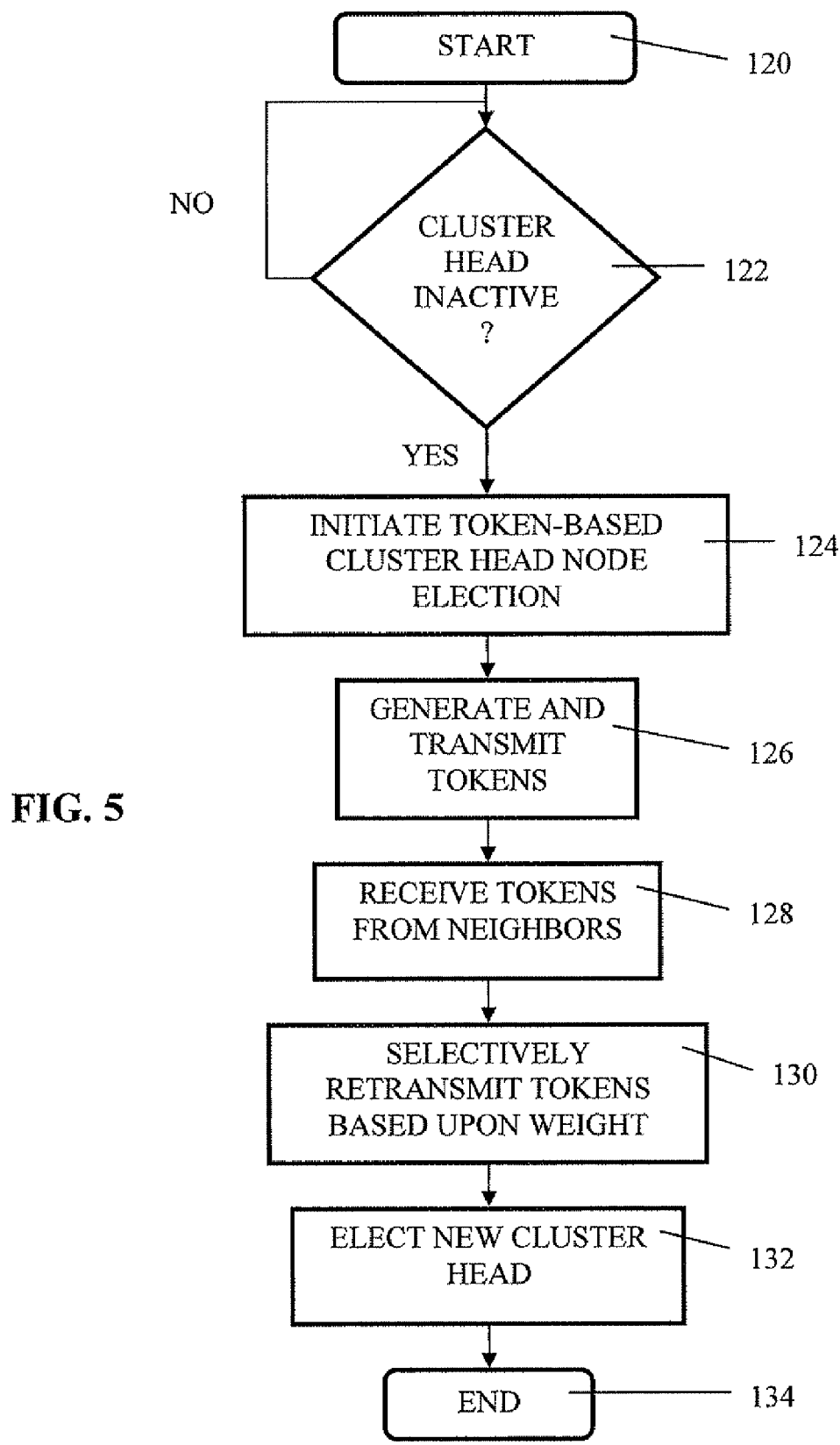
FIG. 5 is a flowchart setting forth steps of a method of electing a cluster head node in accordance with the present invention.

Referring to the flowchart of FIG. 5, various steps of the method in accordance with the present invention will be described. The method aspect of the invention is directed to electing a cluster head node for a group of mobile nodes 12 operating as a cluster within a mobile ad-hoc network. The method begins (block 120) and includes determining whether the currently elected cluster head node appears inactive (block 122), and initiating a token-based cluster head node election, at block 124, based upon the determination. During the election, the cluster mobile nodes 12 generate and transmit tokens 100 having respective token weights (block 126), receive tokens from neighboring nodes (block 128), selectively retransmit the tokens based upon the token weights (block 130), and elect a new cluster head node based upon the token weights (block 132) before ending (block 134).

At block 122, determining that the currently elected cluster head node is inactive may based upon failing to receive a status message from the currently elected cluster head node for a predetermined time period. Also, determining that the currently elected cluster head node is inactive may based upon failing to overhear a response message from the currently elected cluster head node, sending a confirmation request message to the currently elected cluster head node, and failing to receive a confirmation message from the currently elected cluster head node. At block 130, selectively retransmitting the tokens may include retransmitting a best token defined as the received token with a highest weight value. And, at block 132, the election may include storing the node ID of the best token as the cluster head node ID.

The approach is a distributed approach because at the beginning there are many different tokens (N nodes for N tokens) being created and being circulated in the network, but only the best token is bounced out from each node. Any node who has ever received the best token will automatically terminate other tokens, once received. The approach is robust because the best token will be recorded in all the nodes in the cluster. Each node would also have multiple chances to receive the best token. The approach does not require any specific acknowledgment from any particular node and the effect of the unstable links in the network is mitigated. It is a robust mechanism in an unstable ad-hoc network environment. The approach is also bandwidth efficient because the total bandwidth overhead for the election is small because the tokens are relatively small.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A mobile ad-hoc network comprising:
  a plurality of mobile nodes including at least one group of mobile nodes operating as a cluster with a currently elected cluster head node;
  each mobile node comprising a controller and a wireless communications device configured to cooperate therewith to determine whether the currently elected cluster head node appears inactive based upon failing to overhear a response message from the currently elected cluster head node, sending a confirmation request message to the currently elected cluster head node, and failing to receive a confirmation message from the currently elected cluster head node, and initiate a token-based cluster head node election based thereon during which the cluster mobile nodes are configured to
    generate and transmit tokens having respective token weights,
    receive tokens from neighboring nodes,
    selectively retransmit the tokens based upon the token weights, and
    elect a new cluster head node based upon the token weights.

2. The mobile ad-hoc network according to claim 1 wherein the controller and the wireless communications device cooperate to determine whether the currently elected cluster head node appears inactive based upon failing to receive a status message from the currently elected cluster head node for a predetermined time period.

3. The mobile ad-hoc network according to claim 1 wherein the controller and the wireless communications device cooperating to determine whether the currently elected cluster head node appears inactive further includes determining the presence of at least one neighbor node.

4. The mobile ad-hoc network according to claim 1 wherein the tokens comprise respective election messages each including a node ID and a parameter value.

5. The mobile ad-hoc network according to claim 4 wherein the parameter value indicates a number of neighbor nodes of the corresponding cluster node.

6. The mobile ad-hoc network according to claim 4 wherein the associated token weight is defined by a weight value based upon the node ID and the parameter value.

7. The mobile ad-hoc network according to claim 6 wherein the controller and wireless communications device cooperate to retransmit a best token defined as the received token with a highest weight value.

8. The mobile ad-hoc network according to claim 7 wherein the controller stores the node ID of the best token as the cluster head node ID.

9. The mobile ad-hoc network according to claim 4 wherein the election message further includes a group ID defining a boundary for transmission of the token.

10. The mobile ad-hoc network according to claim 9 wherein the election message further includes a time-to-live field defining a number of times the token can be transmitted.

11. A mobile node for operation in a cluster of mobile nodes within in ad-hoc network, the cluster including a currently elected cluster head node, the mobile node comprising:
  a controller and a wireless communications device configured to cooperate therewith to determine whether the currently elected cluster head node appears inactive based upon failing to overhear a response message from the currently elected cluster head node, sending a confirmation request message to the currently elected cluster head node, and failing to receive a confirmation message from the currently elected cluster head node, and to initiate a token-based cluster head node election based thereon including
    generating and transmitting a token having a token weight,
    receiving tokens from neighboring nodes,
    selectively retransmitting the tokens based upon the token weights, and
    electing a new cluster head node based upon the token weights.

12. The mobile node according to claim 11 wherein the controller and the wireless communications device cooperate to determine whether the currently elected cluster head node appears inactive based upon failing to receive a status message from the currently elected cluster head node for a predetermined time period.

13. The mobile node according to claim 11 wherein the tokens comprise respective election messages each including a node ID and a parameter value.

14. The mobile node according to claim 13 wherein the parameter value indicates a number of neighbor nodes of the corresponding cluster node.

15. The mobile node according to claim 13 wherein the associated token weight is defined by a weight value based upon the node ID and the parameter value; wherein the controller and wireless communications device cooperate to retransmit a best token defined as the received token with a highest weight value; and wherein the controller stores the node ID of the best token as the cluster head node ID.

16. The mobile node according to claim 14 wherein the election message further includes a group ID defining a boundary for transmission of the token.

17. The mobile node according to claim 16 wherein the election message further includes a time-to-live field defining a number of times the token can be transmitted.

18. A method of electing a cluster head node for a group of mobile nodes operating as a cluster within a mobile ad-hoc network, the method comprising:
    determining whether the currently elected cluster head node appears inactive based upon failing to overhear a response message from the currently elected cluster head node, sending a confirmation request message to the currently elected cluster head node, and failing to receive a confirmation message from the currently elected cluster head node; and
    initiating a token-based cluster head node election based upon the determination during which the cluster mobile nodes
        generate and transmit tokens having respective token weights,
        receive tokens from neighboring nodes,
        selectively retransmit the tokens based upon the token weights, and
        elect a new cluster head node based upon the token weights.

19. The method according to claim 18 wherein determining whether the currently elected cluster head node appears inactive is based upon failing to receive a status message from the currently elected cluster head node for a predetermined time period.

20. The method according to claim 18 wherein the tokens comprise respective election messages each including a node ID and a parameter value.

21. The method according to claim 20 wherein the parameter value indicates a number of neighbor nodes of the corresponding cluster node.

22. The method according to claim 20 wherein the associated token weight is defined by a weight value based upon the node ID and the parameter value.

23. The method according to claim 22 wherein selectively retransmit the tokens comprises retransmitting a best token defined as the received token with a highest weight value.

24. The method according to claim 23 further comprising storing the node ID of the best token as the cluster head node ID.

25. The method according to claim 20 wherein the election message further includes a group ID defining a boundary for transmission of the token.

26. The method according to claim 25 wherein the election message further includes a time-to-live field defining a number of times the token can be transmitted.

* * * * *